UNITED STATES PATENT OFFICE.

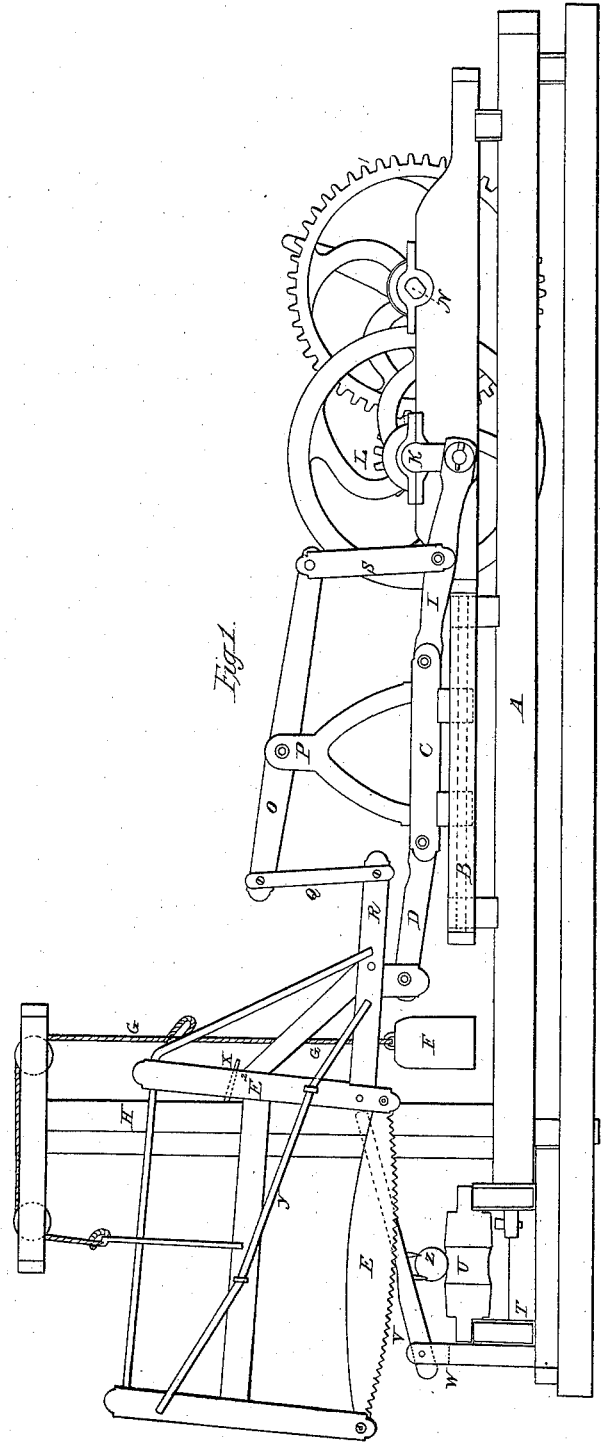

THOS. J. MARSH, OF LIBERTY, INDIANA.

MACHINE FOR CROSS-SAWING TIMBER, FIRE-WOOD, &c.

Specification of Letters Patent No. 3,287, dated September 28, 1843.

*To all whom it may concern:*

Be it known that I, THOMAS J. MARSH, of Liberty, Union county, State of Indiana, have invented a new and useful improvement in the machine for sawing logs, timber, and other articles called "the western wood-sawyer" which is described as follows, reference being had to the annexed drawings of the same making part of this specification.

Figure 1 is a side elevation of the machine.

The frame A of this machine is made of wood, or other material, of suitable size and strength for containing and supporting the several parts hereafter described, being framed and bolted together in such a manner that it can be placed upon a four wheeled carriage to be conveyed from place to place wherever required to be used, or be placed firmly upon the ground in a convenient position for use. In this frame is arranged a pair of horizontal parallel ways B upon which is made to slide back and forth a carriage C to which is attached by a connecting rod D a cross cut saw E for sawing the logs; which saw is balanced and held at the height required by means of a counter weight F attached to a cord G passed over pulleys supported by a vertical post H mortised into the frame. The other end of the sliding carriage is connected by a pitman rod I to the wrist of a crank shaft K turning in boxes on the frame; on which crank shaft is a pinion L into which works a vertical cog wheel M or driver on another crank shaft N lying parallel to the last mentioned crank shaft and which may be turned by any convenient power for propelling the machine or the power may be applied directly to the first mentioned crank shaft by means of a common horse power, or by any other convenient way or manner.

In sawing, the cross cut saw is made to receive a vertical vibratory movement as it moves back and forth for producing the oblique up and down sweep to clear the saw of dust by means of a lever O turning on a fulcrum P on the sliding frame or carriage C before described, said lever being connected by one of its ends, by means of a vertical connecting rod, Q to the outer end of an arm R projecting from the back of the saw frame $E^2$, the other end of the lever being connected by another connecting rod S to the middle of the before mentioned connecting rod I of the crank shaft for giving the lever its vertical vibratory motion which is communicated to the saw frame by the connection before described.

For applying or adapting this machine to the sawing of fire wood, shingle bolts, and other short stuff, a transverse horizontal frame T composed of two horizontal longitudinal parallel timbers united by cross timbers for carrying any convenient number of anti friction rollers U must be keyed, or otherwise secured to the end of the first mentioned frame below the saw for the purpose of bringing the wood to be sawed over said rollers to the saw. To hold the log firmly under the saw while sawing a lever or bar V is used which is pressed or held firmly down upon the log transversely—its fulcrum being a bolt passed through two jaws W and the end of the lever which is placed and works between the jaws.

Z represents the log to be cut.

In sawing trees and long timber the last mentioned frame may not be necessary—it being only requisite to bring the first mentioned frame with the saw to the log and the saw brought down upon the log and the machine set in motion. When a cut has been made and it becomes necessary to move the log forward for a new cut the saw frame is raised by drawing down the counter weight and attaching the cord to a pin X in the post which suspends the saw out of the way until another cut is to be made when the cord is loosened, the weight raised and the saw again brought down upon the log, the machine continuing its motion all the while.

The logs may be drawn to the machine by a rope or chain attached to them and coiled around one of the revolving shafts, the operator drawing at the other end of the rope or chain to take up the slack of the rope or chain.

Any convenient number of the before described saws may be connected to the crank shaft and operated in the manner before described by the same motive power. Circular saws may also be put on the revolving shafts for cutting up the limbs and small pieces of wood turned by the same power. And band gearing may be substituted for the cogged gearing aforesaid. In addition to the horizontal head brace of the saw frame for straining the saw, I use an oblique iron brace Y running from the upper forward corner of the saw frame back to the lower rear corner of the frame to the arm.

What I claim as my invention and which I desire to secure by Letters Patent in the before described machine for sawing is—

The manner of producing the oblique up and down stroke to the saw for clearing itself from the saw dust or chips as described by means of the aforesaid combination of the vibrating lever and sliding carriage one end of the lever being connected to the arm of the saw frame and the other end to the pitman rod of the sliding frame and crank shaft.

THOMAS J. MARSH.

Witnesses:
 WM. P. ELLIOT,
 ALBERT E. JOHNSON.